United States Patent
Yin et al.

(10) Patent No.: US 8,981,628 B2
(45) Date of Patent: Mar. 17, 2015

(54) ULTRA VIOLET IRRADIATING DEVICE FOR ALIGNMENT OF LIQUID CRYSTAL, AND WATER-COOLING COAXIAL TUBE

(71) Applicant: Shenzhen China Star Optoelectronics Technology Co., Ltd., Shenzhen, Guangdong (CN)

(72) Inventors: Chonghui Yin, Shenzhen (CN); Wen-pin Chiang, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 23 days.

(21) Appl. No.: 13/985,828

(22) PCT Filed: Jun. 28, 2013

(86) PCT No.: PCT/CN2013/078378
§ 371 (c)(1),
(2) Date: Aug. 15, 2013

(87) PCT Pub. No.: WO2014/190586
PCT Pub. Date: Dec. 4, 2014

(65) Prior Publication Data
US 2014/0357148 A1    Dec. 4, 2014

(51) Int. Cl.
| | |
|---|---|
| *H01J 1/02* | (2006.01) |
| *H01J 7/24* | (2006.01) |
| *H01J 61/52* | (2006.01) |
| *H01K 1/58* | (2006.01) |
| *H01J 9/20* | (2006.01) |

(52) U.S. Cl.
CPC .................... *H01J 9/20* (2013.01)
USPC ............ 313/22; 313/17; 313/33; 313/35; 445/24; 445/66; 250/504 R; 250/492.1; 34/275; 34/278; 165/177

(58) Field of Classification Search
USPC .......... 445/66, 23–26; 313/17, 22, 24, 26, 33, 313/35–36, 45–46; 250/504, 492.1, 493, 250/436, 453.11–455.11; 34/275, 278; 349/93–94, 191; 165/104.19, 104.33, 165/136, 143, 155, 177, 183, 185
See application file for complete search history.

(56) References Cited

U.S. PATENT DOCUMENTS

| | | | | |
|---|---|---|---|---|
| 4,101,424 | A * | 7/1978 | Schooley et al. | 250/504 R |
| 5,194,740 | A * | 3/1993 | Kogelschatz et al. | 250/492.1 |
| 5,433,920 | A * | 7/1995 | Sizer et al. | 422/24 |
| 6,201,355 | B1 * | 3/2001 | Morgan et al. | 315/248 |
| 7,982,376 | B2 * | 7/2011 | Keen et al. | 313/35 |
| 2007/0149086 | A1 * | 6/2007 | Nakamura | 445/23 |
| 2009/0058249 | A1 * | 3/2009 | Tajika | 313/25 |

* cited by examiner

*Primary Examiner* — Anne Hines
*Assistant Examiner* — Jose M Diaz
(74) *Attorney, Agent, or Firm* — Andrew C. Cheng

(57) ABSTRACT

The present invention provides an ultra violet irradiating device for aligning liquid crystal and also an water-cooling coaxial tube. The ultraviolet irradiating device includes a water-cooling coaxial tube configured with an inter tube and an external pipe enveloping the internal pipe. A light tube is disposed within the internal pipe, and an infrared filter layer is disposed between the internal and external pipes; and an ultra violet filter layer is coated over an external surface of the external pipe so as to filter out an ultra violet light beam having wavelength lower than 320 nm. The breakage of the unit filters resulted from inter pushing with each other or leakage resulted from overlapping of the unit filters can be readily resolved.

19 Claims, 5 Drawing Sheets

ULTRA VIOLET IRRADIATING DEVICE FOR ALIGNMENT OF LIQUID CRYSTAL, AND WATER-COOLING COAXIAL TUBE

FIELD OF THE INVENTION

The present invention relates to a technical field of manufacturing liquid crystal display panel, and more particularly, to an ultra violet irradiating device for alignment of liquid crystal, and further related to a water-cooling coaxial tube.

DESCRIPTION OF PRIOR ART

HVA is an alignment technology related to polymer-stabilizing alignment (PSA), or polymer-stabilizing vertical alignment (PSVA) in the field of manufacture liquid crystal panel. In general, when a substrate is applied with electrical energy, the substrate is further exposed under ultra violet so as to create a side chain reaction between the polymers inside the substrate and the polyimide (PI) or alignment film located on surface of the substrate to as to achieve the objective of aligning the liquid crystal.

Typically, the light beam from a UVM lamp will damage the molecules of the liquid crystal if the ultra violet light beam is directly exposed to irradiate the liquid crystal substrate without any filtering. As a result, the alignment of the liquid crystal will be negatively affected. In general, the wavelength of the ultra violet light ranges from 200~500 nm. The ultra violet light having wavelength under 320 nm will cause damage to the molecules of the liquid crystal to a certain degree. Accordingly, an ultra violet cut filter made from quartz is generally used to screen the ultra violet.

Referring to FIG. 1, an illustrational working diagram of the existing art in aligning a liquid crystal display panel is shown.

As shown in Figure, in an 8.5 generation production line of the liquid crystal display panel, the dimension of the panel 3 is 2200×2500 mm, while the UV filter is quilted by a plurality of unit filter 2. Each unit filter 2 has a dimension of 32×28 mm. The UV light beam from the ultra violet irradiating device for alignment of liquid crystal 1 will be firstly filtered and then expose to irradiate the panel 3.

However, the filter quilted by a plurality unit filters 2 can be readily damaged by internal pushing from each other, such as shown in FIG. 2, see marked portion A. Once there is a leakage of the UV light beam to the substrate, permanent damage will impose onto the substrate and cause a great loss to the product. Nevertheless, damage resulted from internal pushing of the unit filters 2 is difficult to detect. On the other hand, when a plurality of unit filters 2 are quilted together, a so-called overlapped leakage, such as shown in FIG. 2, see marked portion B. On the other hand, the life cycle of the unit filters 2 is comparatively shorter, and normally it has to be replaced every 2-3 years.

Based on the forgoing reasons, the production line has to be frequently halted to inspect the leakage or damage of the unit filters so as to conduct a local replacement of the unit filter.

SUMMARY OF THE INVENTION

It is an object of the present invention to provide an ultra violet irradiating device for alignment of liquid crystal, and further a water-cooling coaxial tube so as to resolve the breakage of unit filter resulted from internal pushing of each other, or the overlapped leakage of the unit filters.

In order to resolve the technical problem discussed above, the present invention introduce a technical solution by providing an ultra violet irradiating device for aligning liquid crystal, comprising:

a water-cooling coaxial tube configured with an inter tube and an external pipe enveloping the internal pipe;

a light tube disposed within the internal pipe;

an infrared filter layer disposed between the internal and external pipes; and an ultra violet filter layer coated over an external surface of the external pipe so as to filter out an ultra violet light beam having wavelength lower than 320 nm.

According to one preferred embodiment of the present invention, wherein the water-cooling coaxial tube further includes a first insulator separating the internal and external pipes;

a second insulator separating the infrared filter layer within the internal and external pipes;

a water inlet arranged on a first end of the coaxial tube, and located in the internal pipe, the external pipe or the first insulator; and a water outlet arranged on a second end of the coaxial tube and located in the internal pipe, the external pipe or the first insulator.

According to one preferred embodiment of the present invention, wherein the water inlet and the water outlet are further interconnected with a water source tube, and a water exhaust tube, respectively According to one preferred embodiment of the present invention, wherein the first insulator is a first end cap sealing the first and second ends of the external pipe, wherein the first end cap is in communicating with the internal and external pipes so as to create a circulating cooling space between the first end cap, the internal pipe and external pipe.

According to one preferred embodiment of the present invention, wherein a heat-dissipating structure is arranged over a surface of the infrared filter layer, and the heat-dissipating structure is slot enlarging the heat-dissipating surface area.

According to one preferred embodiment of the present invention, wherein the irradiating device further includes a refracting shroud mounted with respect to the water-cooling coaxial tube, wherein the refracting shroud has an arc configuration circling the water-cooling coaxial tube.

According to one preferred embodiment of the present invention, wherein the inter tube and the external pipe are made from transparent quartz material.

According to one preferred embodiment of the present invention, wherein the internal pipe and the external pipe are tubular tube or oblong tube.

According to one preferred embodiment of the present invention, wherein the first insulator has a donut shape.

According to one preferred embodiment of the present invention, wherein the second insulator is a bracket or a ball-shaped configuration attached to the internal pipe, the external pipe or the infrared filter layer with bonding.

In order to resolve the technical problem discussed above, the present invention introduce a technical solution by providing a water-cooling coaxial tube, comprising:

a water-cooling coaxial tube configured with an inter tube and an external pipe enveloping the internal pipe;

a light tube disposed within the internal pipe;

an infrared filter layer disposed between the internal and external pipes; and an ultra violet filter layer coated over an external surface of the external pipe so as to filter out an ultra violet light beam having wavelength lower than 320 nm.

The present invention can be concluded with the following advantages. As compared to the existing prior art, the present invention provides an ultra violet irradiating device for alignment of liquid crystal, and further related to a water-cooling coaxial tube in which an ultra violet filter layer is disposed on outer surface of an external pipe so as to properly resolve the breakage of the unit filters resulted from inter pushing with each other or leakage resulted from overlapping of the unit filters.

BRIEF DESCRIPTION OF DRAWINGS

In order to give a better and thorough understanding to the whole and other intended purposes, features and advantages of the technical solution of the present invention, detailed description will be given with respect to preferred embodiments provided and illustrated herebelow in accompanied drawings. Apparently, with the spirit of the embodiments disclosed, person in the skilled in the art can readily come out with other modifications as well as improvements without undue experiment. In addition, other drawings can be readily achieved based on the disclosed drawings. Wherein.

DETAILED DESCRIPTION OF PREFERRED EMBODIMENT

Figure 1:
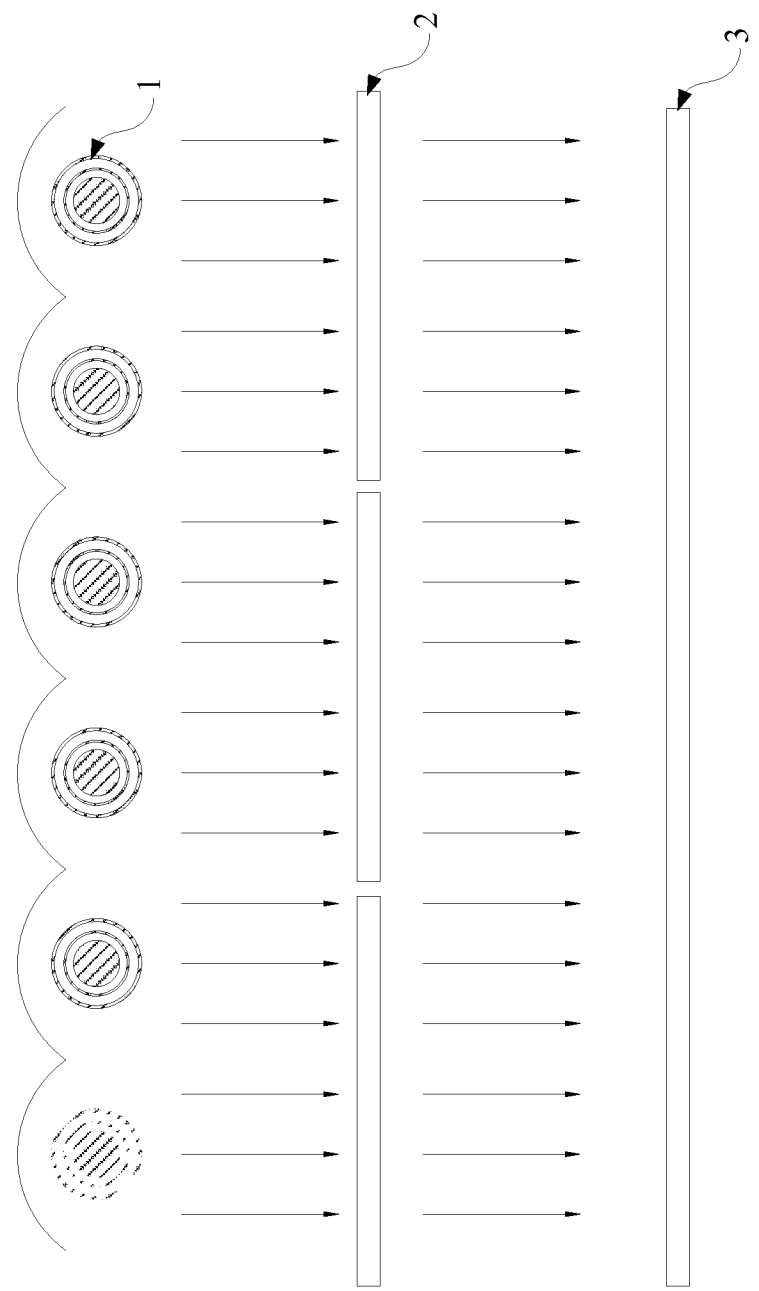
FIG. 1 is an illustrational view of the prior art showing how an alignment of a liquid crystal panel is conducted, wherein substantial configuration of the liquid crystal panel has been omitted.
Figure 2:
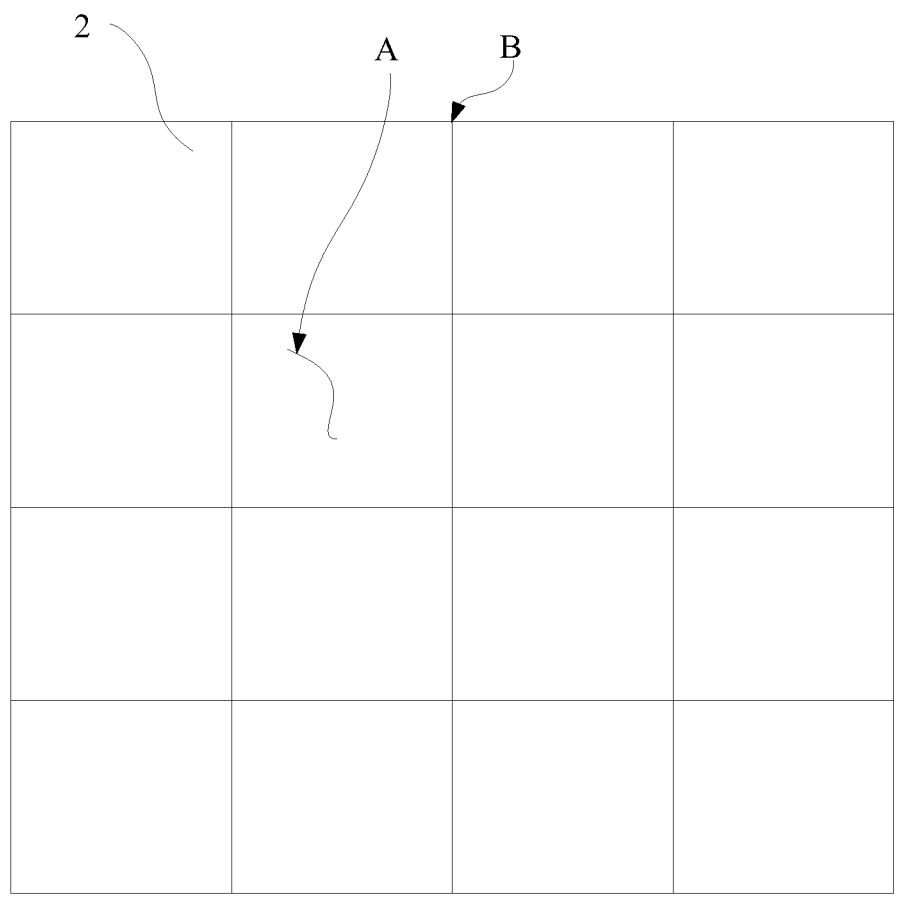
FIG. 2 is a top and illustrational view of an ultra violet filter layer.

In order clearly explain the technology of the embodiment illustrated in the present invention, a brief and concise description will be given along with the accompanied drawings. Apparently, the embodiments illustrated in the drawings are merely some typical embodiments and which can be readily modified by the skilled in the art without any additional laborious efforts so as to transform them into other drawings, and they should all be covered by the appended claims.

Figure 3:
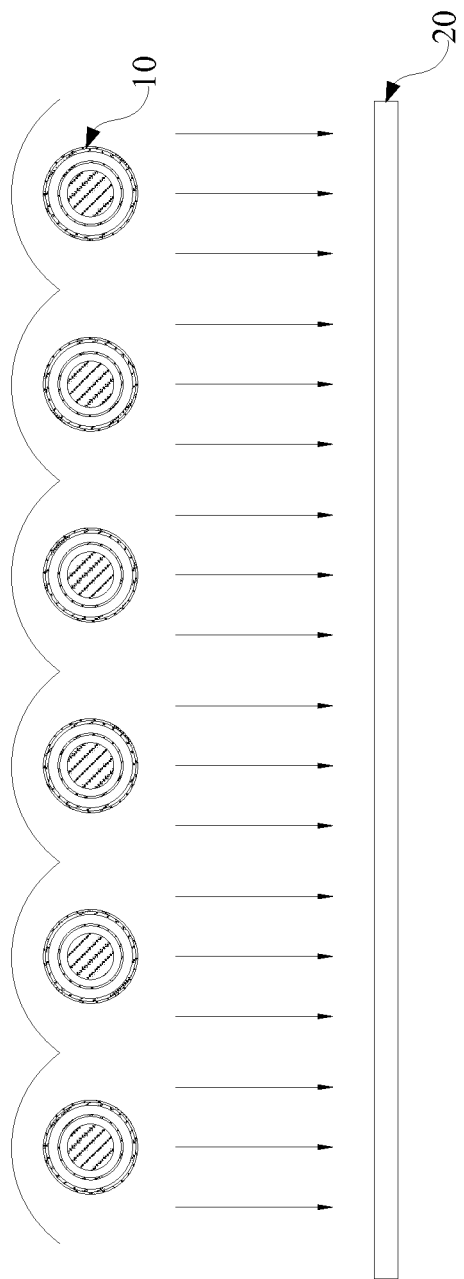
FIG. 3 is an illustrational view of an ultra violet irradiating device for aligning liquid crystal made in according to a preferred embodiment of the present invention.

Referring to FIG. 3, which is an illustrational view of an ultra violet irradiating device for aligning liquid crystal made in according to a preferred embodiment of the present invention.

Referring to FIG. 3, the present invention provides an ultra violet irradiating device 10 for aligning liquid crystal and the ultra violet light beam emitted there will directly expose onto a liquid crystal display panel 20. As compared to the existing technology, the ultra violet light beam does not need to be filtered by the unit filters 2 such as prior art does. Accordingly, breakage of the unit filters 2 resulted from inter pushing with each other or leakage resulted from overlapping of the unit filters 2 can be properly resolved.

Figure 4:
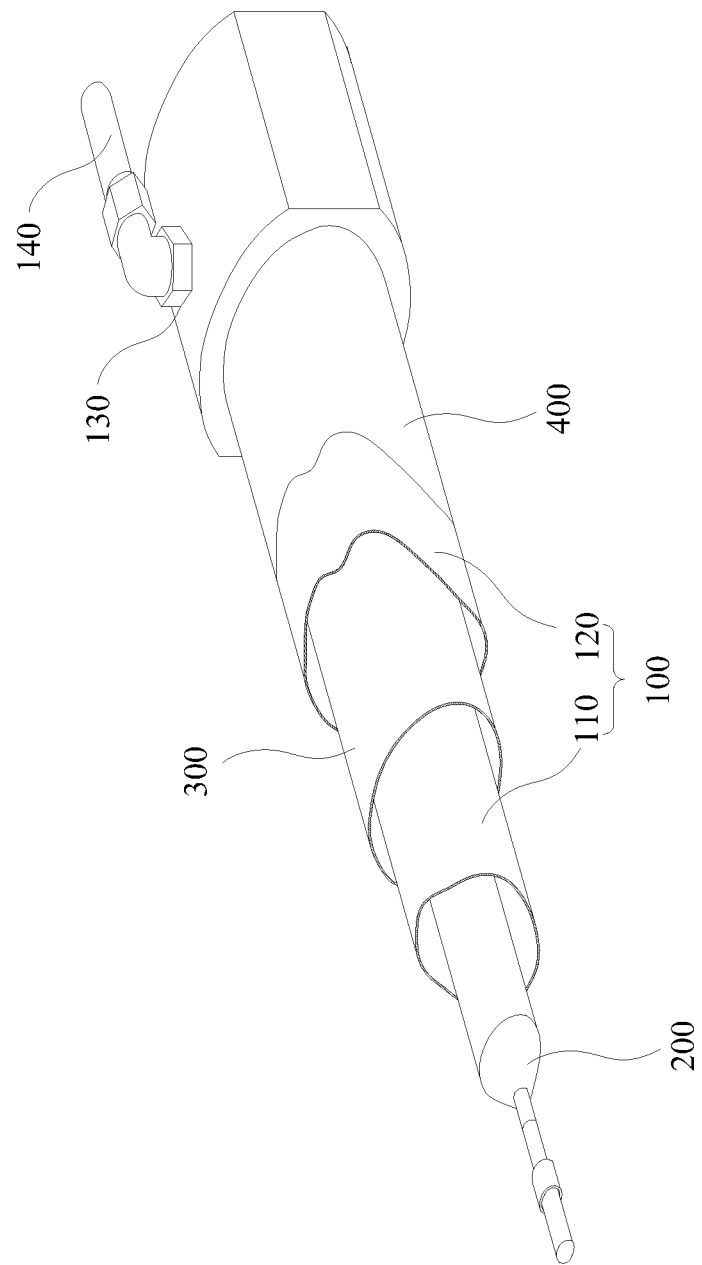
FIG. 4 is an enlarged and a perspective view of an encircled portion of the ultra violet irradiating device for aligning liquid crystal shown in FIG. 3.
Figure 5:
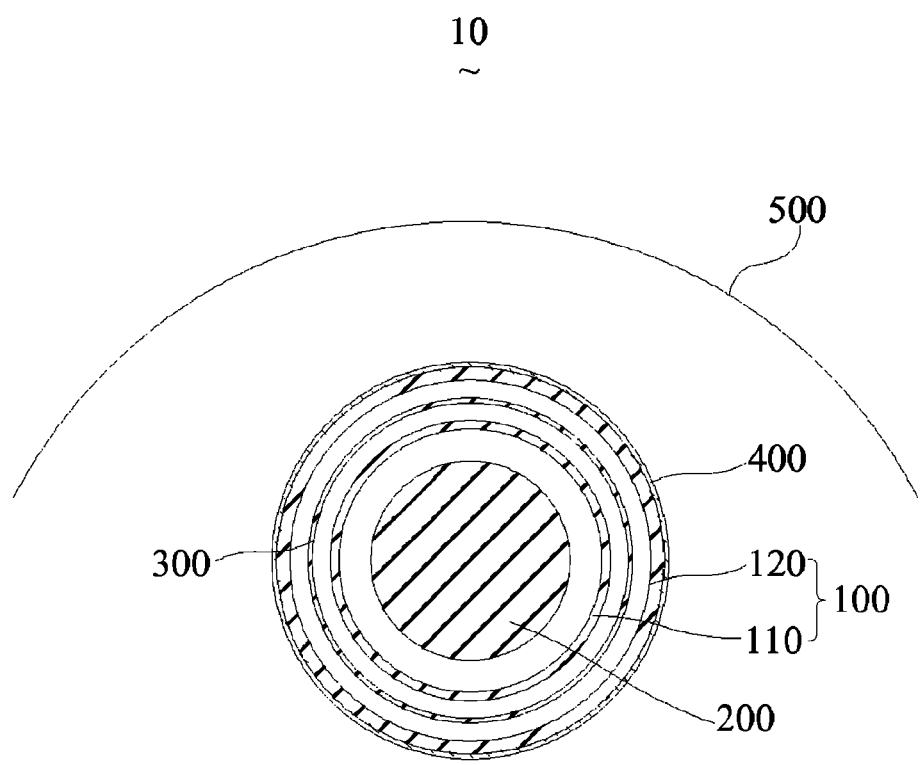
FIG. 5 is an enlarged and a cross sectional view of the ultra violet irradiating device for aligning liquid crystal shown in FIG. 3.

Substantially, referring to FIGS. 4 and 5, wherein FIG. 4 is an enlarged and a perspective view of an encircled portion of the ultra violet irradiating device for aligning liquid crystal shown in FIG. 3; and FIG. 5 is an enlarged and a cross sectional view of the ultra violet irradiating device for aligning liquid crystal shown in FIG. 3.

As shown in FIGS. 4 and 5, the ultra violet irradiating device 10 for aligning liquid crystal generally includes a water-cooling coaxial tube 100, a light tube 200, a ultra-violet layer 300, and a shroud 500.

The water-cooling coaxial tube 100 includes an internal pipe 110 and an external pipe 120 and both can be made from transparent quartz. In the current embodiment, the diameter of the internal pipe 110 is smaller than the diameter of the external pipe 120. Both the internal and external pipes 110, 120 can be embodied as a tubular configuration. However, in other preferred embodiment, both the internal and external pipes 110, 120 can be embodied as hollow and oblong configuration.

In the preferred embodiment, the water-cooling coaxial tube 100 further includes a first and second insulator, an inlet 130, an outlet, an inlet water hose 140 and a water outlet hose.

Wherein the first insulator will separate the internal pipe 110 and the external pipe 120 such that both the internal and the external pipes 110, 120 are in parallel to each other. The second insulator separates an infrared filter layer 300, the internal pipe 110, and the external pipe 120 such that they are all in parallel with each other. Preferably, the second insulator will be disposed the infrared filter layer 300 in a position which is in a center between the internal pipe 110 and the external pipe 120. The second insulator can be a bracket, or a ball-shaped configuration attached to the inter pipe 110, the external pipe 120 or the infrared filter layer 300 by means of bonding or any suitable measurement generally available to the skilled in the art.

The water inlet 130 is arranged on a first end of the water-cooling coaxial tube 100, and located at the external pipe 120. In other preferable embodiment, the water inlet 130 can be disposed on the internal pipe 110 or the first insulator. The water outlet is arranged on a second end of the water-cooling coaxial tube 100, and is located on the internal pipe 110, the external pipe 120, or the first insulator. The water inlet 130 and the water outlet are each connected with a water inlet hose 140, and a water outlet hose.

In the preferred embodiment, the first insulator can be an end cap located on the first and second ends of the internal pipe 110 and the external pipe 120. It can be readily appreciated to the skilled in the art that the end cap has donut shape. The end cap is interconnected to the internal pipe 110 and the external pipe 120 such that a circulating space is defined by the end cap, the internal pipe 110 and the external pipe 120 in which a cooling medium, such as cooling water or other cooling agent can be circulated therein.

The light tube 200 is disposed within the internal pipe 110, and according to a preferred embodiment of the present invention, the light tube 200 has a circular cross section, and in other preferred embodiment, the light tube 200 can be embodied with an oblong configuration. The quantity of the light tube 200 will not be limited to only one. It can be two or more than two light tubes 200 installed therein.

The infrared filter layer 300 is disposed between the internal pipe 110 and the external pipe 120. In the preferred embodiment, the infrared filter layer 300 is formed with heat dissipating structure, such as longitudinal slots defined in a surface of the infrared filter layer 300 so as to enlarge the surface area for heat dissipating. Alternatively, the infrared filter layer 300 is quilted by a plurality of elongated infrared strips interconnected together with a gap therebetween. During the operation, the cooling water circulates within the light tube 200 will dissipate the heat absorbed and accumulated onto the infrared filter layer 300.

The ultra violet filter layer 400 is arranged on external surface of the external pipe 120 so as to filter out the ultra violet light having wavelength shorter than 320 nm. In the preferred embodiment, the ultra violet filter layer 400 can be coated over the surface of the external pipe 120. As compared to the quilting of the unit filters 2, the present invention provides a simplified, but effective filtering process. Since it has only a single layer, a great deal of space can be saved, while the leakage problem can also be properly resolved. The quilting of the unit filters 2 of prior art can be readily replaced.

The refractive shroud 500 has an arc-shaped configuration surrounding the water-cooling coaxial tube 100, and redirects the light beam from the ultra violet irradiating device 10 for aligning liquid crystal panel to the liquid crystal display panel.

In conclusion, it can be readily appreciated by the skilled in the art that as compared to the prior art, the present invention provides an ultra violet irradiating device 10 for alignment of liquid crystal, and further related to a water-cooling coaxial tube 100 in which the ultra violet filter layer 400 is disposed on the outer surface of the external pipe 120 so as to properly resolve the breakage of the unit filters resulted from inter pushing with each other or leakage resulted from overlapping of the unit filters 2. In addition, since the leakage of the unfiltered ultra violet resulted form the malfunctioned unit filters 2 is properly blocked, the permanent damage to the liquid crystal display panel is prevented. In addition, the ultra violet filter layer 400 has a longer service life as compared to the quilted unit filters 2. It can be used for a certain long period of time without the need of replacement. Accordingly, the manufacturing cost is greatly reduced, and the laborious waste and production loss resulted form replacement of the ultra violet filter can be properly avoided.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

The invention claimed is:

1. An ultra violet irradiating device for aligning liquid crystal, comprising:
    a water-cooling coaxial tube configured with an inter tube and an external pipe enveloping the internal pipe;
    a light tube disposed within the internal pipe;
    an infrared filter layer disposed between the internal and external pipes; and
    an ultra violet filter layer coated over an external surface of the external pipe so as to filter out an ultra violet light beam having wavelength lower than 320 nm;
    wherein the water-cooling coaxial tube further includes
    a first insulator separating the internal and external pipes;
    a second insulator separating the infrared filter layer within the internal and external pipes;
    a water inlet arranged on a first end of the coaxial tube, and located in the internal pipe, the external pipe or the first insulator; and
    a water outlet arranged on a second end of the coaxial tube and located in the internal pipe, the external pipe or the first insulator.

2. An ultra violet irradiating device for aligning liquid crystal, comprising:
    a water-cooling coaxial tube configured with an inter tube and an external pipe enveloping the internal pipe;
    a light tube disposed within the internal pipe;
    an infrared filter layer disposed between the internal and external pipes; and
    an ultra violet filter layer coated over an external surface of the external pipe so as to filter out an ultra violet light beam having wavelength lower than 320 nm.

3. The ultra violet irradiating device for aligning liquid crystal as recited in claim 2, wherein the water-cooling coaxial tube further includes
    a first insulator separating the internal and external pipes;
    a second insulator separating the infrared filter layer within the internal and external pipes;
    a water inlet arranged on a first end of the coaxial tube, and located in the internal pipe, the external pipe or the first insulator; and
    a water outlet arranged on a second end of the coaxial tube and located in the internal pipe, the external pipe or the first insulator.

4. The ultra violet irradiating device for aligning liquid crystal as recited in claim 3, characterized in that the water inlet and the water outlet are further interconnected with a water source tube, and a water exhaust tube, respectively.

5. The ultra violet irradiating device for aligning liquid crystal as recited in claim 3, characterized in that the first insulator is a first end cap sealing the first and second ends of the external pipe, wherein the first end cap is in communicating with the internal and external pipes so as to create a circulating cooling space between the first end cap, the internal pipe and external pipe.

6. The ultra violet irradiating device for aligning liquid crystal as recited in claim 2, characterized in that a heat-dissipating structure is arranged over a surface of the infrared filter layer, and the heat-dissipating structure is slot enlarging the heat-dissipating surface area.

7. The ultra violet irradiating device for aligning liquid crystal as recited in claim 2, characterized in that the irradiating device further includes a refracting shroud mounted with respect to the water-cooling coaxial tube, wherein the refracting shroud has an arc configuration circling the water-cooling coaxial tube.

8. The ultra violet irradiating device for aligning liquid crystal as recited in claim 2, wherein the inter tube and the external pipe are made from transparent quartz material.

9. The ultra violet irradiating device for aligning liquid crystal as recited in claim 2, wherein the internal pipe and the external pipe are tubular tube or oblong tube.

10. The ultra violet irradiating device for aligning liquid crystal as recited in claim 2, characterized in that the first insulator has a donut shape.

11. The ultra violet irradiating device for aligning liquid crystal as recited in claim 3, wherein the second insulator is a bracket or a ball-shaped configuration attached to the internal pipe, the external pipe or the infrared filter layer with bonding.

12. A water-cooling coaxial tube, characterized in that it includes:
    a first insulator separating the internal and external pipes;
    an infrared filter layer disposed between the internal and external pipes; and
    an ultra violet filter layer coated over an external surface of the external pipe so as to filter out an ultra violet light beam having wavelength lower than 320 nm.

13. The water-cooling coaxial tube as recited in claim 12, characterized in that the water-cooling coaxial tube further includes:
    a first insulator separating the internal and external pipes;
    a second insulator separating the infrared filter layer within the internal and external pipes;

a water inlet arranged on a first end of the coaxial tube, and located in the internal pipe, the external pipe or the first insulator; and a water outlet arranged on a second end of the coaxial tube and located in the internal pipe, the external pipe or the first insulator.

14. The water-cooling coaxial tube as recited in claim 13, characterized in that the first insulator is a first end cap sealing the first and second ends of the external pipe, wherein the first end cap is in communicating with the internal and external pipes so as to create a circulating cooling space between the first end cap, the internal pipe and external pipe.

15. The water-cooling coaxial tube as recited in claim 12, characterized in that a heat-dissipating structure is arranged over a surface of the infrared filter layer, and the heat-dissipating structure is slot enlarging the heat-dissipating surface area.

16. The water-cooling coaxial tube as recited in claim 12, wherein the inter tube and the external pipe are made from transparent quartz material.

17. The water-cooling coaxial tube as recited in claim 12, wherein the internal pipe and the external pipe are tubular tube or oblong tube.

18. The water-cooling coaxial tube as recited in claim 13, characterized in that the first insulator has a donut shape.

19. The water-cooling coaxial tube as recited in claim 13, wherein the second insulator is a bracket or a ball-shaped configuration attached to the internal pipe, the external pipe or the infrared filter layer with bonding.

\* \* \* \* \*